US012307914B2

(12) United States Patent
Meier

(10) Patent No.: US 12,307,914 B2
(45) Date of Patent: May 20, 2025

(54) SYSTEM AND METHOD FOR SOFTWARE-DEFINED DRONES

(71) Applicant: Auterion AG, Zürich (CH)

(72) Inventor: Lorenz Meier, Zürich (CH)

(73) Assignee: Auterion AG, Zürich (CH)

( * ) Notice: Subject to any disclaimer, the term of this patent is extended or adjusted under 35 U.S.C. 154(b) by 208 days.

(21) Appl. No.: 17/307,199

(22) Filed: May 4, 2021

(65) Prior Publication Data

US 2021/0343170 A1    Nov. 4, 2021

Related U.S. Application Data

(60) Provisional application No. 63/019,558, filed on May 4, 2020.

(51) Int. Cl.
*G08G 5/80* (2025.01)
*B64U 70/80* (2023.01)
(Continued)

(52) U.S. Cl.
CPC ............. *G08G 5/80* (2025.01); *G05D 1/0088* (2013.01); *G05D 1/0808* (2013.01); *G08G 5/30* (2025.01);
(Continued)

(58) Field of Classification Search
CPC ....... B64C 39/024; B64C 11/00; B64C 13/18; B64C 11/30; B64C 2027/8272;
(Continued)

(56) References Cited

U.S. PATENT DOCUMENTS 5,054,713 A * 10/1991 Langley ................. B64C 39/06
244/73 C
5,377,109 A * 12/1994 Baker ...................... G06J 1/00
714/E11.017
(Continued)

FOREIGN PATENT DOCUMENTS

| CN | 105120230 A | * | 12/2015 |
| CN | 105208335 A | * | 12/2015 |
| CN | 207292457 U | * | 5/2018 |

OTHER PUBLICATIONS

Translation of CN-207292457-U retrieved from Espacenet on Jan. 31, 2023 (Year: 2023).*

(Continued)

*Primary Examiner* — Fadey S. Jabr
*Assistant Examiner* — Faris Asim Shaikh
(74) *Attorney, Agent, or Firm* — DICKINSON WRIGHT PLLC

(57) ABSTRACT

A vehicle controller for operating an autonomous vehicle includes an inertial measurement unit (IMU) configured measure specific forces acting upon the autonomous vehicle, and a flight controller configured to execute a high-speed control loop to periodically update commands to a plurality of control actuators for controlling a position or an attitude of the autonomous vehicle based on data from the IMU regarding the specific forces acting upon the autonomous vehicle. The vehicle controller also includes a mission computer including a processor programmed to control a mission of the autonomous vehicle. The vehicle controller also includes a cellular data radio configured to wirelessly communicate via a cellular network. The vehicle controller also includes a housing containing the IMU, the flight
(Continued)

controller, the mission computer, and the cellular data radio. A method of operating an autonomous vehicle is also provided.

20 Claims, 6 Drawing Sheets

(51) Int. Cl.
| | |
|---|---|
| *B64U 101/30* | (2023.01) |
| *G05D 1/00* | (2024.01) |
| *G08G 5/30* | (2025.01) |
| *H04W 84/02* | (2009.01) |

(52) U.S. Cl.
CPC ............ *H04W 84/02* (2013.01); *B64U 70/80* (2023.01); *B64U 2101/30* (2023.01); *B64U 2201/10* (2023.01)

(58) Field of Classification Search
CPC ......... B64C 27/22; B64C 27/06; B64C 27/26; B64C 39/022; B64C 5/10; B64C 27/57; G08G 5/045; G08G 5/003; G05D 1/0088; G05D 1/0808; G05D 1/101; G05D 1/0858; G05D 1/0866; G05D 1/0011; G05D 3/00; G05D 3/12; G05D 1/10; G05D 1/102; G05D 1/105; G05D 1/106; G05D 1/1062; G05D 1/1064; G05D 1/107; G05D 1/108; G05D 1/08; G05D 1/0825; G05D 1/04; G05D 1/042; G05D 1/046; G05D 1/0615; G05D 1/0607; G05D 1/063; G05D 1/0638; G05D 1/0623; H04W 84/02; B64U 70/00; B64U 2101/00; B64U 2201/104; B64U 2201/00; B64U 2201/10; B64U 2201/20; B64U 2201/202; G05B 19/02; G05B 24/02; G05B 2219/11; G05B 2219/1132; G05B 2219/1185; G05B 2219/10; G05B 2219/15011; G05B 2219/30; G05B 2219/20; G05B 13/02; G05B 13/00; G05B 13/042; G05B 13/045; G05B 13/021; G05B 13/0225; G05B 13/022; G05B 11/01; G05B 11/00; G05B 1/00; G05B 6/00; G05B 6/02; G05B 1/01; G05B 1/03; H04Q 9/00; F05B 2240/921; F05B 2240/923; F05B 2270/10; F05B 2270/102; F05B 2270/18; F05B 2270/404; F05B 2270/60; F05B 2270/602; F05B 2270/606; F05B 2270/502; F05B 2270/504; F05B 2270/50; F05B 2270/70; F05B 2270/709; F05B 2270/707; F05B 2270/706; F05B 2270/705; F05B 2270/704; F05B 2270/703; F05B 2270/702; F05B 2270/701; F05B 2270/8041; F05B 2270/8042; F03D 1/02; F03D 7/00; F03D 9/32

See application file for complete search history.

(56) References Cited

U.S. PATENT DOCUMENTS

| | | | | |
|---|---|---|---|---|
| 5,581,250 | A * | 12/1996 | Khvilivitzky | G08G 5/0086 382/104 |
| 5,883,586 | A * | 3/1999 | Tran | G08G 5/0052 340/963 |
| 6,131,854 | A * | 10/2000 | Nicolai | B64F 1/04 244/114 R |
| 9,303,971 | B1 * | 4/2016 | Butscher | G01B 7/30 |
| 10,099,783 | B1 * | 10/2018 | Nilson | B64U 10/14 |
| 11,585,660 | B1 * | 2/2023 | Opperman | G01C 21/166 |
| 2008/0168480 | A1 * | 7/2008 | Twoey | G06F 9/541 719/328 |
| 2010/0292874 | A1 * | 11/2010 | Duggan | B64C 39/024 701/11 |
| 2014/0117147 | A1 * | 5/2014 | Hanna | B64C 39/024 244/2 |
| 2014/0155098 | A1 * | 6/2014 | Markham | H04B 1/0064 455/456.3 |
| 2016/0225263 | A1 * | 8/2016 | Salentiny | G08G 5/0069 |
| 2016/0246304 | A1 * | 8/2016 | Canoy | G01M 17/00 |
| 2017/0023937 | A1 | 1/2017 | Loianno et al. | |
| 2017/0023939 | A1 * | 1/2017 | Krouse | G01C 21/3852 |
| 2017/0029101 | A1 * | 2/2017 | Weissenberg | B64U 30/299 |
| 2017/0069214 | A1 * | 3/2017 | Dupray | G05D 1/104 |
| 2017/0184629 | A1 * | 6/2017 | Pan | G01D 18/008 |
| 2017/0320570 | A1 * | 11/2017 | Horn | B64D 47/08 |
| 2017/0344000 | A1 * | 11/2017 | Krishnamoorthy | G08G 5/0008 |
| 2017/0369166 | A1 * | 12/2017 | van den Heuvel | B64U 20/87 |
| 2018/0039272 | A1 | 2/2018 | Seydoux et al. | |
| 2018/0222573 | A1 * | 8/2018 | Gillett | G05D 1/0858 |
| 2019/0002125 | A1 * | 1/2019 | Bin | B64C 39/024 |
| 2019/0004512 | A1 * | 1/2019 | Liu | G05D 1/106 |
| 2019/0039728 | A1 * | 2/2019 | Hutson | B64U 10/25 |
| 2019/0041851 | A1 * | 2/2019 | Ortiz | G05D 1/0077 |
| 2019/0042227 | A1 * | 2/2019 | Sharma | G06V 20/17 |
| 2019/0107846 | A1 * | 4/2019 | Roy | G08G 5/0052 |
| 2019/0258277 | A1 * | 8/2019 | Qian | G08G 5/045 |
| 2019/0334741 | A1 * | 10/2019 | Dormiani | G05D 1/0077 |
| 2019/0339718 | A1 | 11/2019 | Koch | |
| 2020/0122830 | A1 * | 4/2020 | Anderson | B60L 53/50 |
| 2020/0189731 | A1 * | 6/2020 | Mistry | H04B 7/18502 |
| 2020/0218288 | A1 * | 7/2020 | Johnson | B64U 30/26 |
| 2020/0285230 | A1 * | 9/2020 | Ma | G05D 1/101 |
| 2021/0053489 | A1 * | 2/2021 | Golov | B60R 11/04 |
| 2021/0053819 | A1 * | 2/2021 | deKoninck | G01L 19/04 |
| 2021/0129982 | A1 * | 5/2021 | Collins | B64C 39/024 |
| 2021/0284326 | A1 * | 9/2021 | Eglin | B64C 27/82 |

OTHER PUBLICATIONS

A_Two-Speed_Actuator_for_Robotics_with_Fast_Seamless_Gear_Shifting.pdf (Year: 2015).*
Translation of CN-105120230-A retrieved from Espacenet on Jan. 31, 2023 (Year: 2023).*
Translation of CN-105208335-A retrieved from Espacenet on Jan. 31, 2023 (Year: 2023).*
Printer Circuit Board Wikipedia (Year: 2020).*
Anonymous: "A Smartphone Is the Brain for This Autonomous Quadcopter—IEEE Spectrum," Jan. 31, 2015; retrieved from the Internet: https://spectrum.ieee.org/automaton/robotics/drones/a-smartphone-is-the-brain-for-this-autonomous-quadcopter.
Anonymous, "Cloud Cap Technology Piccolo II—Expanded Capability for Advanced Applications"; https://www.cloudcaptech.com/images/uploads/documents/Piccolo_II_Data_Sheet.pdf; Jan. 31, 2014 retrieved from the internet May 4, 2017.
International Search Report regarding corresponding PCT App. No. PCT/IB2021/053749; mailed Sep. 13, 2021.

* cited by examiner

SYSTEM AND METHOD FOR SOFTWARE-DEFINED DRONES

CROSS REFERENCE TO RELATED APPLICATIONS

This U.S. utility patent application claims the benefit of U.S. Provisional Patent Application No. 63/019,558, filed May 4, 2020, the contents of which is incorporated herein by reference in its entirety.

FIELD

The present disclosure relates generally to unmanned vehicles, also called drones, and systems for controlling and for communicating with drones. More specifically, the present disclosure relates to unmanned aircraft systems (UAS).

BACKGROUND

Unmanned vehicle systems, such as aerial drones, include a flight management unit (FMU) onboard the vehicle to manage operation of the vehicle. An inertial measurement unit (IMU) may be coupled to the FMU to measure specific forces acting upon the vehicle, using a combination of accelerometers, gyroscopes, and/or magnetometers. The FMU may be specifically configured to execute a high-speed control loop for controlling the vehicle using actuators, such as servo motors and electric speed controls (ESCs) coupled to electric motors, based on signals from the IMU. Conventional FMUs are designed to execute the high-speed control loop while minimizing power consumption and minimizing weight. Some FMUs may include interfaces to control inputs, such as a radio for receiving remote control instructions, and to additional control outputs, such as payload control signals. Payload control signals may include, for example, position commands for servo motors configured to move a camera gimbal.

Conventional IMUs may be mounted to the vehicle with vibration isolating mounts, to reduce interference from vibratory noise and to reduce shock loads in case of a rough landing or a collision with the ground or other object.

Some unmanned vehicles may include a mission computer, which may include one or more special-purpose and/or general-purpose processors having a relatively high performance for performing computationally-intensive tasks, such as machine vision.

SUMMARY

An aspect of the disclosed embodiments includes a vehicle controller for operating an autonomous vehicle. The vehicle controller includes: an inertial measurement unit (IMU) configured measure specific forces acting upon the autonomous vehicle, and a flight controller configured to execute a high-speed control loop to periodically update commands to a plurality of control actuators for controlling a position or an attitude of the autonomous vehicle based on data from the IMU regarding the specific forces acting upon the autonomous vehicle. The vehicle controller also includes a mission computer including a processor programmed to control a mission of the autonomous vehicle. The vehicle controller also includes a cellular data radio configured to wirelessly communicate via a cellular network. The vehicle controller also includes a housing containing the IMU, the flight controller, the mission computer, and the cellular data radio.

An aspect of the disclosed embodiments includes a vehicle controller for operating an autonomous vehicle. The vehicle controller includes: an inertial measurement unit (IMU) configured measure specific forces acting upon the autonomous vehicle, and a flight controller configured to execute a high-speed control loop to periodically update commands to a plurality of control actuators for controlling a position or an attitude of the autonomous vehicle based on data from the IMU regarding the specific forces acting upon the autonomous vehicle. The vehicle controller also includes a mission computer including a processor programmed to control a mission of the autonomous vehicle. The vehicle controller also includes a housing containing the IMU, the flight controller, and the mission computer. The mission computer includes an application programming interface to provide vehicle status information and payload data to a third-party application.

An aspect of the disclosed embodiments includes a method of operating an autonomous vehicle. The method includes: measuring specific forces acting upon the autonomous vehicle by an inertial measurement unit (IMU); sending commands to each of a plurality of control actuators, by a flight controller, for controlling a position or an attitude of the autonomous vehicle based on data from the IMU regarding the specific forces acting upon the autonomous vehicle; commanding, by a mission computer, for the flight controller to change a position or orientation of the autonomous vehicle; and communicating, with a server, by the mission computer using a cellular data radio. The IMU, the flight controller, the mission computer, and the cellular data radio are all disposed within a housing located onboard the autonomous vehicle.

These and other aspects of the present disclosure are disclosed in the following detailed description of the embodiments, the appended claims, and the accompanying figures.

BRIEF DESCRIPTION OF THE DRAWINGS

Further details, features and advantages of designs of the invention result from the following description of embodiment examples in reference to the associated drawings.

DETAILED DESCRIPTION

Figure 1:
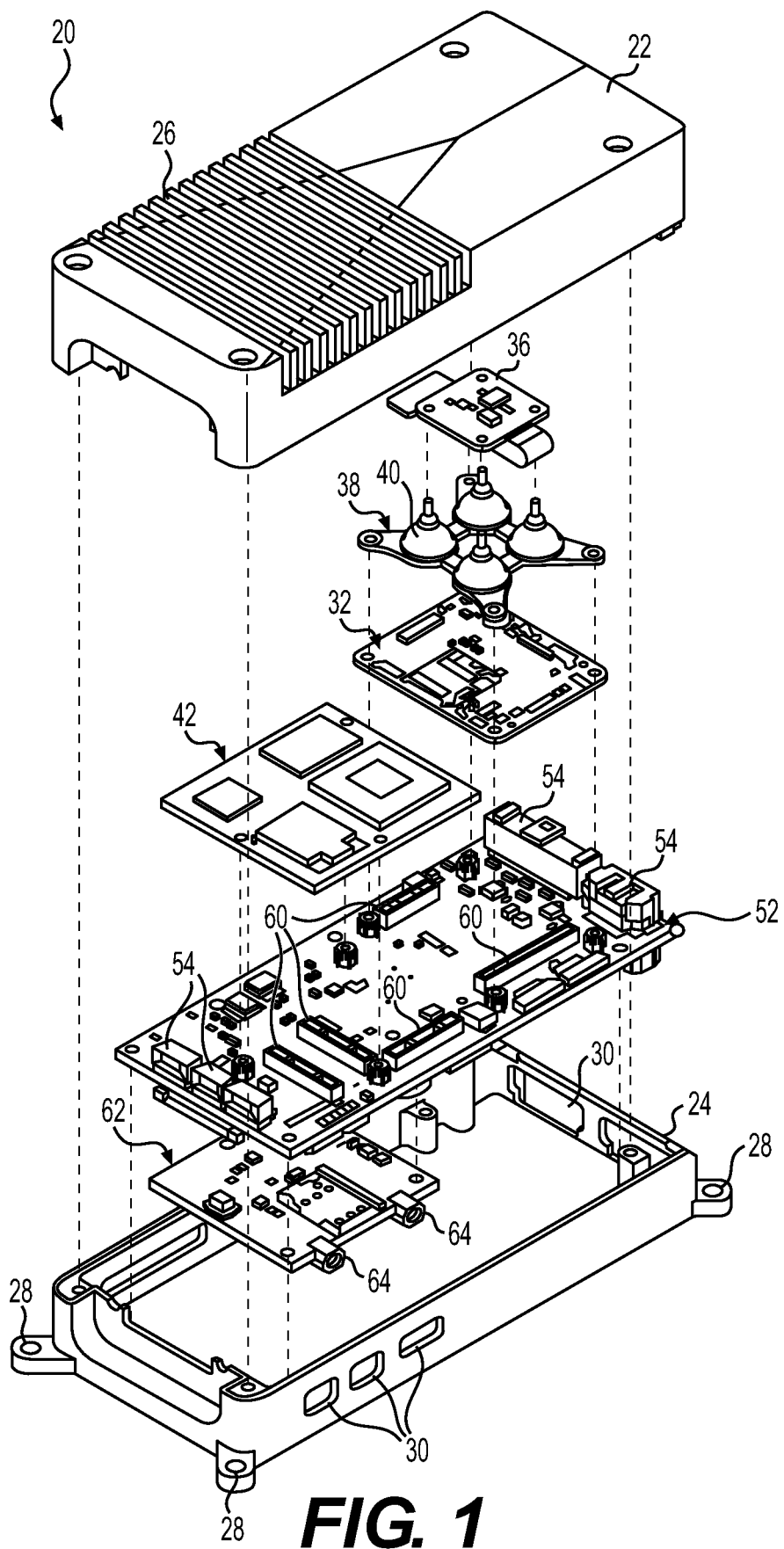
FIG. 1 shows an exploded diagram of a controller for an autonomous vehicle, according to an aspect of the present disclosure.

A system and method for software-defined drones is described herein. The system includes a vehicle controller 20 that is configured to operate onboard an unmanned vehicle. In some embodiments, the unmanned vehicle is an unmanned aerial vehicle, such as a multicopter, a helicopter, a fixed-wing aircraft, a vertical takeoff and landing (VTOL) vehicle, etc. However, the unmanned vehicle may be any type of air, land, and/or sea vehicle. The vehicle controller 20 combines a unified flight controller, mission computer, and networking device in a single package. The unmanned aerial vehicle may be a multi-copter, such as a quadcopter or an octo-copter.

The following terms, unless otherwise defined in this disclosure, should be understood to have the following definitions:

AMC (Auterion Mission Control)—a ground control software package providing full flight control and mission planning for drones;

API (Application Programming Interface)—a computing interface to a software component or a system, that defines how other components or systems can use it;

Autonomous vehicle—an unmanned vehicle that can be operated autonomously using embedded systems in conjunction with onboard sensors and GPS;

CAN (Controller Area Network)—a vehicle bus standard allowing microcontrollers and devices to communicate;

Cloud Suite—a distributed web-based hardware and software platform configured to store, process, and present data from one or more drones;

Drone—an unmanned vehicle that can be operated autonomously using embedded systems in conjunction with onboard sensors and GPS;

Enterprise PX4—a software package configured to run on a processor onboard a drone for controlling operation of the drone and for collecting and processing data;

ESC (Electronic Speed Control)—an electronic circuit that controls and regulates the speed of an electric motor;

FMU (Flight Management Unit)—a controller configured to manage operation of an aerial drone;

FPV (First-Person View)—a perspective of an actual or hypothetical driver or pilot in a vehicle;

GPS (Global Positioning System)—any ground-based and/or satellite-based radionavigation system including but not limited to the U.S. Global Positioning System, the Russian Global Navigation Satellite System (GLONASS), China's BeiDou Navigation Satellite System, the European Union Galileo positioning system, India's NavIC system, Japan's Quasi-Zenith Satellite System (QZSS);

IMU (Inertial Measurement Unit)—an electronic device that measures and reports a body's specific force, angular rate, and sometimes the orientation of the body, using a combination of accelerometers, gyroscopes, and sometimes magnetometers;

LTE (Long-Term Evolution)—any mobile (i.e. cellular) wireless data communications standard for mobile devices, including but not limited to GSM/EDGE, 4G, and 5G wireless data communications standards;

MAVLink—a very lightweight messaging protocol for communicating with drones and between onboard drone components;

MAVSDK—MAVLink Software Development Kit (SDK) Library with APIs for C++, iOS, Python and Android;

MIPI CSI (Camera Serial Interface)—a widely adopted, simple, high-speed protocol primarily intended for point-to-point image and video transmission between cameras and host devices;

Open PPB (Pixhawk Payload Bus)—a hardware and software interconnection standard for connecting a controller with one or more payload devices, such as cameras and camera gimbals;

PWM (Pulse Width Modulation)—an interface standard for controlling a device, such as a servo or an ESC (Electronic Speed Control);

PX4—an open-source autopilot system for operating autonomous aircraft;

ROS2 (Robot Operating System version 2)—a set of software libraries and tools for building robot applications;

RTC—Real-Time Clock;

SBUS—a serial communication protocol developed by Futaba for transmitting multiple device control channels on a single interface;

SDK (Software development kit)—a collection of software development tools in one package;

SPI (Serial Peripheral Interface)—a synchronous serial communication interface specification used for short-distance communication, primarily in embedded systems;

UART (universal asynchronous receiver-transmitter)—a computer hardware device for asynchronous serial communication in which the data format and transmission speeds are configurable;

UI—User Interface;

UX—User Experience;

UTM—Unmanned Aircraft System Traffic Management;

Unmanned—configured to be piloted by a computer;

VIO (Visual-Inertial odometry)—the process of estimating the state (pose and velocity) of an agent (e.g., an aerial robot) by using only the input of one or more cameras plus one or more Inertial Measurement Units (IMUs) attached to it.

FIG. 1 shows an exploded diagram of a vehicle controller 20 for an autonomous vehicle, according to an aspect of the present disclosure. The vehicle controller 20 includes a housing 22, 24 having a cover 22 and a baseplate 24 that fit together in a clamshell arrangement. The housing 22, 24 has a generally rectangular shape and may be made of metal, plastic, or any other suitable material. For example, the housing 22, 24 may be made of aluminum or magnesium. The housing 22, 24 may be coated with a paint or an anodized coating to reduce wear while also dissipating heat. The remaining components of the vehicle controller 20 are held within an interior space between the cover 22 and the baseplate 24 of the housing 22, 24. The cover 22 defines an integrated heat sink 26 for removing heat from internal components. The integrated heat sink 26 may be formed as a plurality of planar fins extending in parallel and spaced apart from one another at regular intervals. However, the integrated heat sink 26 may take other forms, such as pins, posts, one or more heat tubes or radiators, etc. The vehicle controller 20 may include one or more fans to increase airflow over the integrated heat sink 26. The baseplate 24 includes a plurality of mounting tabs 28 for securing the vehicle controller 20 to an autonomous vehicle. For example, the mounting tabs 28 may be secured with fasteners, such as screws or bolts, to one or more structural elements of the autonomous vehicle. The baseplate 24 defines a plurality of holes 30 for accessing electrical connectors and/or other features of the vehicle controller 20.

The vehicle controller 20 also includes a flight controller 32, which may also be called a flight management unit (FMU). The flight controller 32 may include one or more processors mounted on a printed circuit board (PCB). However, the flight controller 32 may take other forms, such as a single integrated circuit. The flight controller 32 may be configured to operate a flight control loop to periodically issue or revise commands to one or more vehicle control actuators for controlling the operation of the autonomous vehicle. The vehicle control actuators may include, for example, one or more servo motors and/or electronic speed controls (ESCs). In some embodiments, the flight control loop may operate at a speed of at least about 100 Hz. In some embodiments, the flight control loop may operate at a speed of at least about 1 kHz.

The vehicle controller 20 also includes an inertial measurement unit (IMU) 36 configured to measure and report specific forces acting upon the vehicle controller 20, angular rate, and/or orientation of the vehicle controller 20 in three-dimensional space. The IMU 36 may include one or more accelerometers, gyroscopes, and/or magnetometers in order to determine the forces, angular rate, and/or orientation of the vehicle controller 20. The IMU 36 may be in direct communication with the flight controller 32. In some embodiments, the flight controller 32 may poll or otherwise read updated status information from the IMU 36 each iteration of the flight control loop.

In some embodiments, the IMU 36 may include a heat spreader base of thermally conductive material configured to provide an even distribution of heat between components on the IMU 36, and thus improving accuracy of the IMU 36.

The IMU 36 is mounted to the flight controller 32 by an IMU bracket 38. The IMU bracket 38 includes a plurality of dampers 40 of resilient material, such as rubber or foam, disposed between the IMU 36 and the flight controller 32. The dampers 40 may provide vibration isolation and/or damping, which may reduce interference from vibratory noise, such as periodic vibrations from motors or other sources. The dampers 40 may also reduce shock loads transmitted to the IMU in case of rough landings and/or collisions.

In some embodiments, the IMU bracket 38 may provide a rigid connection between the IMU 36 and the housing 22, 24. Such a rigid connection may not include any vibration isolation between the IMU 36 and the and the flight controller 32 or any other component of the vehicle controller 32.

The vehicle controller 20 also includes a mission computer 42. The mission computer 42 may include one or more processors mounted on a PCB. However, the mission computer 42 may take other forms, such as two or more components, or as a single integrated circuit.

The vehicle controller 20 also includes a base board 52. The base board 52 may include a PCB with a plurality of external ports 54 for connecting to devices outside of the housing 22, 24 via the holes 30. The base board 52 also includes a plurality of internal ports 60 for receiving electrical connections to devices within the housing 22, 24, such as the flight controller 32 and the mission computer 42. The base board 52 may provide for power distribution and/or communications between the flight controller 32 and the mission computer 42 devices and/or from one or more of the internal devices and the external ports 54.

The vehicle controller 20 also includes an LTE module 62 to provide wireless data communications via a cellular network. The LTE module 62 includes a pair of antenna ports 64. Additionally or alternatively, the LTE module 62 may include one or more onboard antennas. The LTE module 62 may include one or more components mounted to a PCB that may extend parallel to the base board 52, with the base board 52 sandwiched between the LTE module 62 and the mission computer 42. The LTE module 62 may be connected to the base board 52 via one or more of the internal ports 60 for receiving power and/or to provide communications between the LTE module 62 and the mission computer 42.

Figure 2:
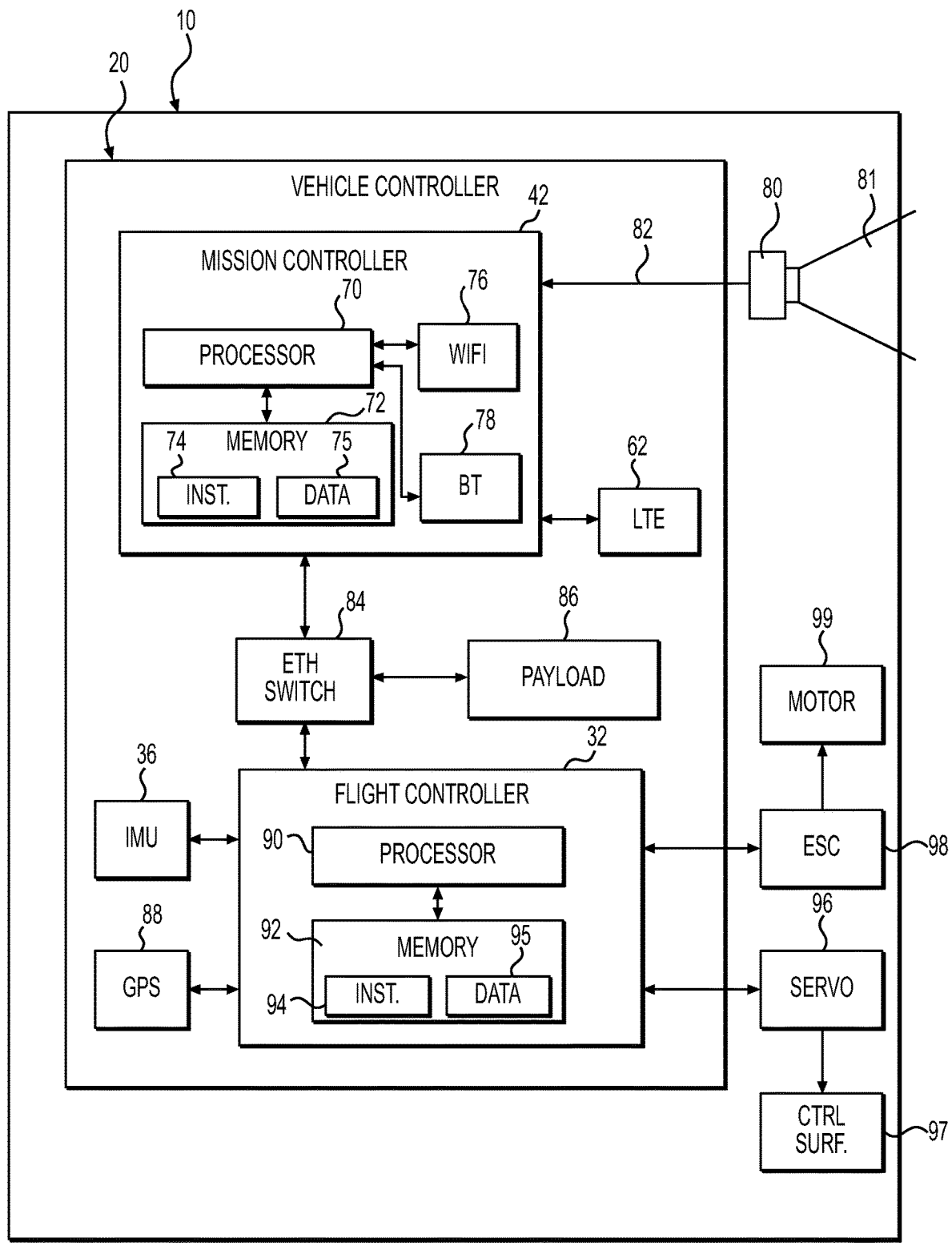
FIG. 2 shows a block diagram of an autonomous vehicle with the controller of FIG. 1, according to principles of the present disclosure.

FIG. 2 shows a block diagram of an autonomous vehicle 10, including the vehicle controller 20 configured as a vehicle controller 20. FIG. 2 shows details of the vehicle controller 20, including some functional units of the flight controller 32 and the mission computer 42. The mission computer 42 includes a first processor 70 coupled to a first memory 72 holding first instructions 74 for execution by the first processor 70. The first memory 72 also holds first data 75, such as parameters and/or settings for operating the mission computer 42. The first data 75 may include mission data, such as data from one or more cameras and/or other sensors. The first memory 72 may be integrated into a package with the first processor 70. Alternatively or additionally, the first memory 72 may include one or more packages that are separate from, and in functional communication with, the first processor 70. The first memory 72 may include Flash storage, although other types of non-volatile memory may be used. The first memory 72 may include one or more removable storage devices, such as SD cards. Alternatively or additionally, the first memory 72 may include one or more non-removable storage devices, such as eMMC storage and/or a solid state drive (SSD). The first memory 72 may include at least about 16 GB of storage capacity. However, the first memory 72 may include larger storage capacity.

The first processor 70 may include one or more special-purpose and/or general-purpose processors having a relatively high performance for performing computatially-intensive tasks, such as machine vision. The first processor 70 may include multiple processing cores. In some embodiments, the first processor may include four or more processing cores. Each of the processing cores of the first processor 70 may operate at a clock speed of 1.8 GHz or greater. The first processor 70 may include 4GB of temporary storage memory (RAM). However, the first processor 70 may include any amount of temporary storage memory.

The mission computer 42 also includes one or more wireless communications radios 76, 78 including a Wi-Fi radio 76 and a Bluetooth radio 78. The Wi-Fi radio 76 may support one or more Wi-Fi standards, such as any of the Wireless LAN (WLAN) and/or Mesh standards included within the Institute of Electrical and Electronics Engineers (IEEE) 802.11x standards. The wireless communications radios 76, 78 may provide for short range and/or medium range wireless digital communications with the mission computer 42. The wireless communications radios 76, 78 may be located on a same package with the first processor 70. The wireless communications radios 76, 78 may support other wireless communications standards, such as, Zigbee, Near-Field communication (NFC), etc.

The mission computer 42 is in functional communication with the LTE module 62 for communicating with remote devices via a wireless data network. The mission computer 42 is also configured to receive data from a camera 80 having a field of view 81 via a direct camera interface 82. The camera 80 may include a single and/or stereoscopic vision. The camera 80 may be configured to capture images in the visible light spectrum and/or in non-visible spectra, such as infrared (IR) or ultraviolet (UV). The direct camera interface 82 may include a high-speed digital interface, such as a High-Definition Multimedia Interface (HDMI) interface or a Mobile Industry Processor Interface (MIPI) camera interface. The direct camera interface 82 may be configured to transmit video, still images, and/or audio data from the camera 80 to the mission computer 42. The direct camera interface 82 may also transmit data, such as control signals, from the mission computer 42 to the camera 80.

The vehicle controller 20 also includes an Ethernet (ETH) switch 84 connected to each of the flight controller 32 and the mission computer 42 for transmitting digital data therebetween. A payload device 86, such as a camera gimbal and/or one or more sensors, may also be connected to the Ethernet switch 84. Thus, the mission computer 42 may transmit and receive data and/or control signals to and from the payload device 86.

The flight controller 32 includes a second processor 90 coupled to a second memory 92 holding second instructions 94 for execution by the second processor 90. The second memory 92 also holds second data 95, such as parameters and/or settings for operating the flight controller 32. The second memory 92 may be integrated into a package with the second processor 90. Alternatively or additionally, the second memory 92 may include one or more packages that are separate from, and in functional communication with, the second processor 90. The second memory 92 may include Flash storage, although other types of non-volatile memory may be used. The second memory 92 may include at least about 16 GB of storage capacity. However, the second memory 92 may include larger storage capacity.

The second processor 90 may include one or more special-purpose and/or general-purpose processors configured for low-power operation. The second processor 90 may include one or more processing cores. For example, the second processor 90 may include a 32-bit ARM Cortex M4 core with a floating-point unit (FPU). The second processor 90 may include a second 32-bit core for redundancy. Each of the processing cores of the second processor 90 may operate at a clock speed of 200 MHz-480 MHz or greater. The second processor 90 may include 1 MB-2 MB of temporary storage memory (RAM). However, the second processor 90 may include any amount of temporary storage memory.

The flight controller 32 is in communication with the IMU 36. For example, the IMU 36 may have a direct digital connection to the flight controller 32. The direct digital connection may include any serial or parallel data connection. The flight controller 32 is also in communication with a global positioning system (GPS) receiver 88. The GPS receiver 88 may have a direct digital connection to the flight controller 32, such as a serial or parallel data connection. Alternatively or additionally, the flight controller 32 may receive position data from the GPS receiver 88 via a data network, such as the Ethernet switch 84 or a universal serial bus (USB) hub. The flight controller 32 is also in functional communication with one or more control actuators 96, 98. The control actuators 96, 98 may include a servo motor 96 coupled to a control surface 97 for controlling a position of the control surface. Additionally or alternatively, the control actuators 96, 98 may include an electric speed control (ESC) 98 electrically connected to an electric motor 99 and configured to control the speed of the electric motor 99 connected thereto. One servo motor 96 and one ESC 98 are shown, by way of example, on FIG. 2. However, the autonomous vehicle may include several different servo motors 96 and/or ESCs 98, depending on the configuration of the autonomous vehicle. For example, an autonomous vehicle configured as a quad copter, having four lifting rotor blades, may include four ESCs 98, and no servo motors 96. An autonomous vehicle configured as a fixed-wing airplane may include one or more ESCs 98 for controlling electric motors 99 connected to propellers, and several servo motors 96 configured to control motion of corresponding control surfaces 97, such as a rudder, elevator, ailerons, etc. An autonomous vehicle configured as a vertical takeoff and landing (VTOL) aircraft may include a combination of ESCs 98 used for controlling electric motors 99 connected to rotor blades, and one or more servo motors 96 configured to move corresponding control surfaces 97.

The flight controller 32 may execute the high-speed control loop to periodically update commands to the control actuators 96, 98 to control the position and/or attitude of the autonomous vehicle based on data regarding the current position, attitude, and/or rate of change of position and/or attitude, which may be provided by the IMU 36 and/or the GPS receiver 88. The flight controller 32 may control the position and/or attitude to direct the autonomous vehicle to a position and/or to follow a path that may be provided by the mission computer 42. In some embodiments, the mission computer 42 may function as an autopilot, directing the flight controller 32 to move the autonomous vehicle between a series of waypoints. In some embodiments, the mission computer 42 may direct the flight controller 32 to change course based on, for example, obstacle avoidance and/or to land at a landing site that the mission computer 42 may determine as being a safe place to land.

Figure 3:
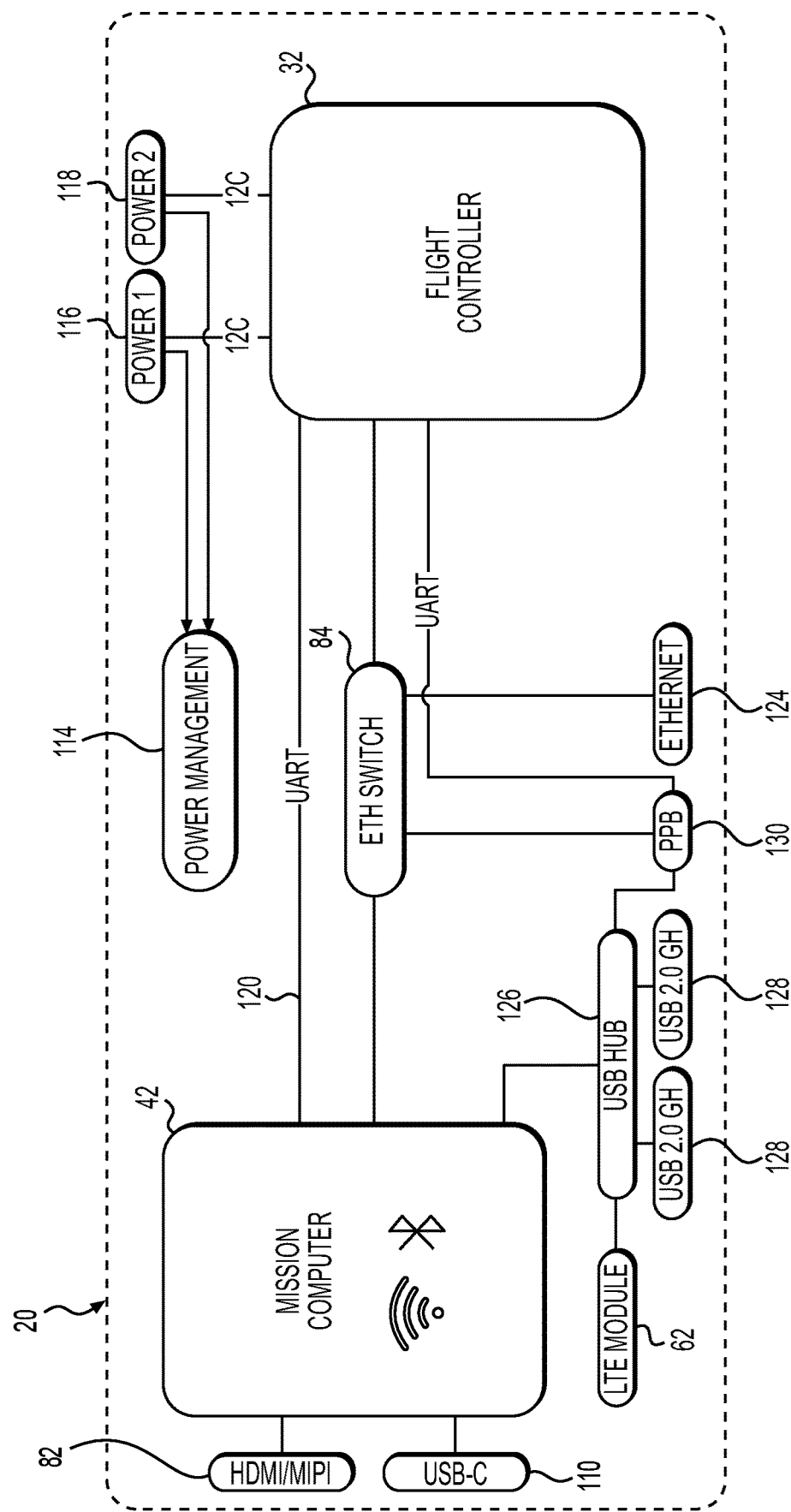
FIG. 3 shows a block diagram of a controller for an autonomous vehicle, according to principles of the present disclosure.

FIG. 3 shows a block diagram of a vehicle controller 20 for an autonomous vehicle, according to an aspect of the present disclosure. The vehicle controller 20 may be similar or identical to the vehicle controller 20 shown in FIGS. 1-2. The vehicle controller 20 includes a flight controller 32, a mission computer 42, and an Ethernet switch 84 configured to provide communications between the flight controller 32 and the mission computer 42. The vehicle controller 20 includes the direct camera interface 82 in the form of an HDMI and/or MIPI port that is coupled to the mission computer 42 for connection to one or more cameras 80. The second controller. A USB-C port 110 is connected to the mission computer.

A power management unit 114 is configured to receive electrical power from a first power supply 116 and from a second power supply 118. The power supplies 116, 118 may each include one or more batteries. The power supplies 116, 118 may be configured for redundant operation, allowing the vehicle controller 20 to operate in response to an interruption in power from one of the power supplies 116, 118. Either or both of the power supplies 116, 118 may be configured to receive power from another source, such as one or more solar cells or from a generator or alternator coupled to an internal combustion engine on the autonomous vehicle. The power management unit 114 may be configured to distribute power from the power supplies 116, 118 to other components within the second controller, such as the flight controller 32, the mission computer, and the Ethernet switch 84. The power management unit 114 may be configured to keep the components of the second controller functioning at full capacity, even in the case of a loss or interruption of power from one of the power supplies 116, 118. Alternatively, or additionally, the power management unit 114 may be configured to cause components within the vehicle controller 20 to operate in a reduced power mode in the case of a loss or interruption of power from one of the power supplies 116, 118. The determination of whether to operate the components in the reduced power mode may depend on one or more factors. Such factors may include, for example, an operating mode of the second controller (e.g. human controlled or fully autonomous), the amount of charge left in a battery associated with the functional one of the power supplies 116, 118, or a requirement to conserve energy to provide the autonomous vehicle with sufficient range to reach a predetermined location, such as a known safe landing zone.

The vehicle controller 20 includes a direct serial data communications link 120 between the flight controller 32 and the mission computer 42. This direct serial data communications link 120 may provide for redundancy in case the Ethernet connection becomes unavailable. Alternatively or additionally, the direct serial data communications link 120 may be used for messages, such as periodic updates of GPS coordinates from the flight controller to the mission computer and/or for communication of flight control commands and/or waypoint coordinates from the mission computer 42 to the flight controller 32.

The vehicle controller 20 also includes a USB hub 126 connected to the mission computer 42 and configured to provide multiple USB interfaces for communicating with the mission computer 42. The vehicle controller 20 includes multiple USB ports 128 connected to the USB hub 126. FIG. 3 shows two such USB ports 128, which are configured as USB 2.0 with 6-pin JST-GH connectors for medium-speed connection to external devices. It should be appreciated that the vehicle controller 20 may include any number of the USB ports 128, and they may have a different form factor and they may operate using any version of the USB protocol, including, for example, USB 2.0 USB 3.0, USB 3.1, etc.

The vehicle controller 20 also includes a payload bus connector 130. The payload bus connector 130 may be configured based on the Pixhawk Payload Bus (PPB) standard. The payload bus connector 130 may combine USB, Ethernet, and/or serial (UART) data communications interfaces with the flight controller 32 and/or with the mission computer 42. The vehicle controller 20 also includes an Ethernet port 124 coupled to the Ethernet switch 84. The Ethernet port 124 may include an RJ-45 connector. However, the Ethernet port may include other types of connectors, such as a JST connector.

Figure 4:
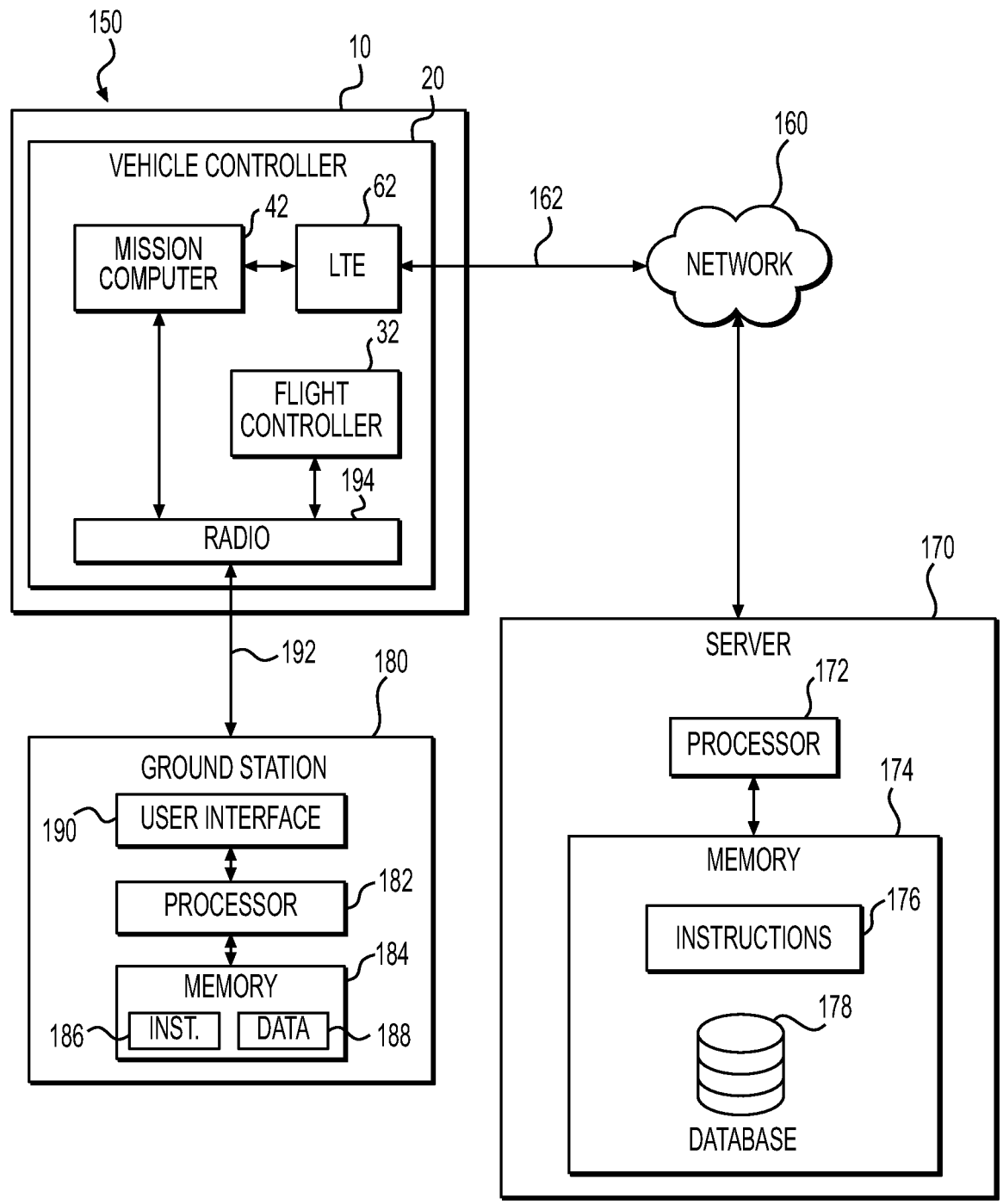
FIG. 4 shows a block diagram of a system for controlling an autonomous vehicle, according to principles of the present disclosure.

FIG. 4 shows a block diagram of a system 150 for controlling one or more autonomous vehicles 10, according to an aspect of the present disclosure. The system 150 includes one or more autonomous vehicles 10, each having one or more corresponding vehicle controllers 20. A single autonomous vehicle 10, having one vehicle controller 20 is shown on FIG. 4 for the sake of simplicity. The system 150 also includes a server 170 and a ground station 180.

The LTE module 62 of the vehicle controller is configured to communicate data to and/or from the server 170 via a communications network 160 using one or more digital wireless data connections 162. The communications network 160 may include the internet and/or an isolated network. The communications network 160 may include a commercial wireless (i.e. cellular) data network, such as an LTE network. The vehicle controller 20 may be configured to transmit data, such as location and/or payload data to the server 170 via the communications network 160. The server 170 may be configured to transmit data, such as mission planning and/or firmware updates to the vehicle controller 20 via the communications network 160.

The server 170 includes a third processor 172 coupled to a third memory 174 holding third instructions 176 for execution by the third processor 172. The third memory 174 also holds third data 178, such as historical data regarding a fleet of multiple autonomous vehicles 10. The third data 178 may be stored in a database within the third memory 174. The third data 178 may be distributed amongst one or more physical computer devices, which may be physically separate from one another. The server 170 may be configured to present the historical data via a web interface. Alternatively or additionally, the server 170 may be configured to present the historical data via other interfaces, such as in programs or applications on one or more computers or mobile devices (e.g. smartphones).

The ground station 180 includes a fourth processor 182 coupled to a fourth memory 184 holding fourth instructions 186 for execution by the fourth processor 182. The fourth memory 184 also holds fourth data 188. The ground station 180 may present a user interface 190 for monitoring and/or controlling the operation of the autonomous vehicle 10. For example, the mission computer 42 may be configured to set and/or to modify waypoints in a mission to be followed by the autonomous vehicle 10. Alternatively or additionally, the ground station 180 may provide an interface for an operator to control and/or monitor operation of one or more payload devices, such as sensors, onboard the autonomous vehicle.

In some embodiments, and as shown in FIG. 4, the autonomous vehicle 10 may include a flight control radio 194 in communication with the flight controller 32 and/or the mission computer 42. The flight control radio 194 may provide bidirectional communications between the ground station 180 and the vehicle controller 20. The flight control radio 194 may receive commands from the ground station 180. Additionally or alternatively, the flight control radio 194 may transmit status data, such as telemetry data and/or payload data from the vehicle controller 20 to the ground station 180. Alternatively or additionally, the ground station 180 may communicate with the mission computer 42 via the Wi-Fi radio 76 and/or via the Bluetooth radio 78.

Figure 5:
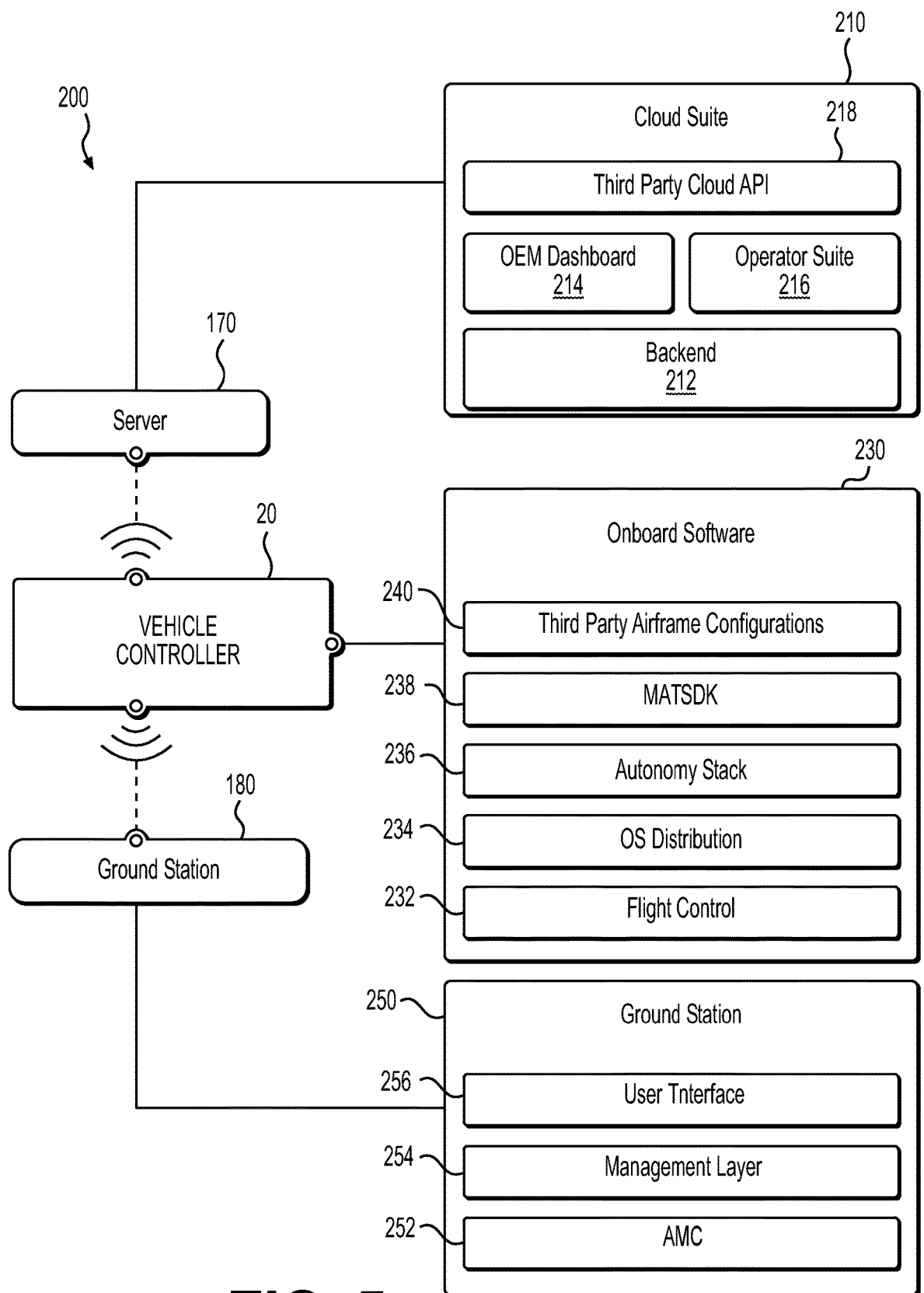
FIG. 5 shows a block diagram of software components in a system for controlling an autonomous vehicle, according to principles of the present disclosure.

FIG. 5 shows a block diagram of software components in a system 200 for controlling an autonomous vehicle 10.

The server 170 is configured to run a cloud suite 210 of software. The cloud suite 210 includes a backend processor 212. The backend processor 212 may provide the low-level communications with one or more of the vehicle controllers 20. The backend processor 212 may provide interfaces to a database or other data storage system for saving and/or retrieving data regarding operation of one or more autonomous vehicles. The cloud suite 210 also includes an OEM dashboard 214, an operator suite 216, and a third-party cloud API 218.

The OEM dashboard 214 may provide data and controls to visualize and summarize fleet data regarding one or more autonomous vehicles 10 and/or data regarding missions planned and/or completed. The OEM dashboard 214 may also provide an ability to monitor fleet performance, and/or pilot compliance and efficiency. The OEM dashboard 214 may also enable remote management of automatic software updates for updating software in the flight controller 32, mission computer 42, and/or in other processors, such as in a payload controller. The operator suite 216 may enable remote control of the autonomous vehicle 10. For example, a pilot may revise mission settings of the autonomous vehicle 10 and/or take manual control of flying the autonomous vehicle 10 using the operator suite 216. The operator suite 216 may provide controls for the pilot to control the autonomous vehicle 10. The operator suite 216 may also provide the pilot with data regarding the operation of the autonomous vehicle. Such data may include, for example, one or more live video feeds, telemetry data, position and heading, etc.

The third-party cloud API 218 provides a standardized interface for programs or other controllers to interface with the cloud suite 210. For example, the third-party cloud API 218 may allow a client application to obtain specific reporting data. Additionally or alternatively, the third-party cloud API 218 may allow interfaces for monitoring and/or controlling the vehicle controller 20 and/or one or more payload devices onboard the autonomous vehicles 10.

As also shown on FIG. 5, the vehicle controller 20 may run an onboard software suite 230. The onboard software suite 230 includes flight control software 232, operating system (OS) distribution 234, an autonomy stack 236, a MAVSDK application 238, and third-party airframe configurations 240. The flight control software 232 may run on the flight controller 32 and may control operation of the control actuators 96, 98 for operating the autonomous vehicle 10. The OS distribution 234 may run on the mission computer 42 and may be configured to control updates and versioning of software applications running on the mission computer 42, the flight controller 32, and/or on any other onboard controllers, such as in one or more payload controllers. The autonomy stack 236 may operate on the mission computer 42 and may enable autonomous operation of the autonomous vehicle 10. In a most basic sense, the autonomy stack 236 may function as an autopilot, enabling the autonomous vehicle 10 to navigate between predetermined waypoints. Additionally or alternatively, the autonomy stack 236 may provide for machine vision, which may be used for obstacle avoidance or for safe landing zone detection.

The MAVSDK application 238 may provide for messaging between devices and/or processors onboard the autonomous vehicle and/or between the vehicle controller 20 and the server 170 and/or the ground station 180. The MAVSDK application 238 may implement the MAVLink protocol. Additionally or alternatively, other messaging protocols may be used. The messaging protocols used may depend on the communications interface (e.g. serial, Ethernet, or USB) used to convey the messages.

The third-party airframe configurations 240 may include settings and/or applications tailored to specific airframe configurations. For example, a third-party airframe configuration 240 for an autonomous vehicle 10 configured as a quad copter may differ from a third-party airframe configuration 240 for an autonomous vehicle 10 configured as fixed-wing airplane.

As also shown on FIG. 5, the ground station 180 may run a ground station software suite 250. The ground station software suite 250 includes Auterion Mission Control (AMC) 252, a management layer 254, and a user interface generator 256. AMC 252 may provide low-level operations, such as establishing and maintaining communications with the vehicle controller 20. The management layer 254 may translate and/or store data between AMC 252 and the user interface generator 256. The user interface generator 256 may provide displays and/or controls for use by a pilot interfacing with the user interface 190 of the ground station 180. For example, the user interface generator 256 may provide a graphical user interface in an application running on the user interface 190. The graphical user interface may include several different displays and controls for adjusting various parameters relating to operation of the autonomous vehicle 10. The graphical user interface may include, for example, a waypoint control interface for viewing and changing waypoints to be followed by the autonomous vehicle. A pilot may click a waypoint control interface on the user interface 190 and enter coordinates of a revised waypoint. The management layer 254 may receive those revised waypoint coordinates, verify that they are valid, and pass the revised waypoint coordinates to AMC 252. AMC 252 may transmit the revised waypoint coordinates to the vehicle controller 20 and verify that the revised waypoint coordinates are received.

Figure 6:
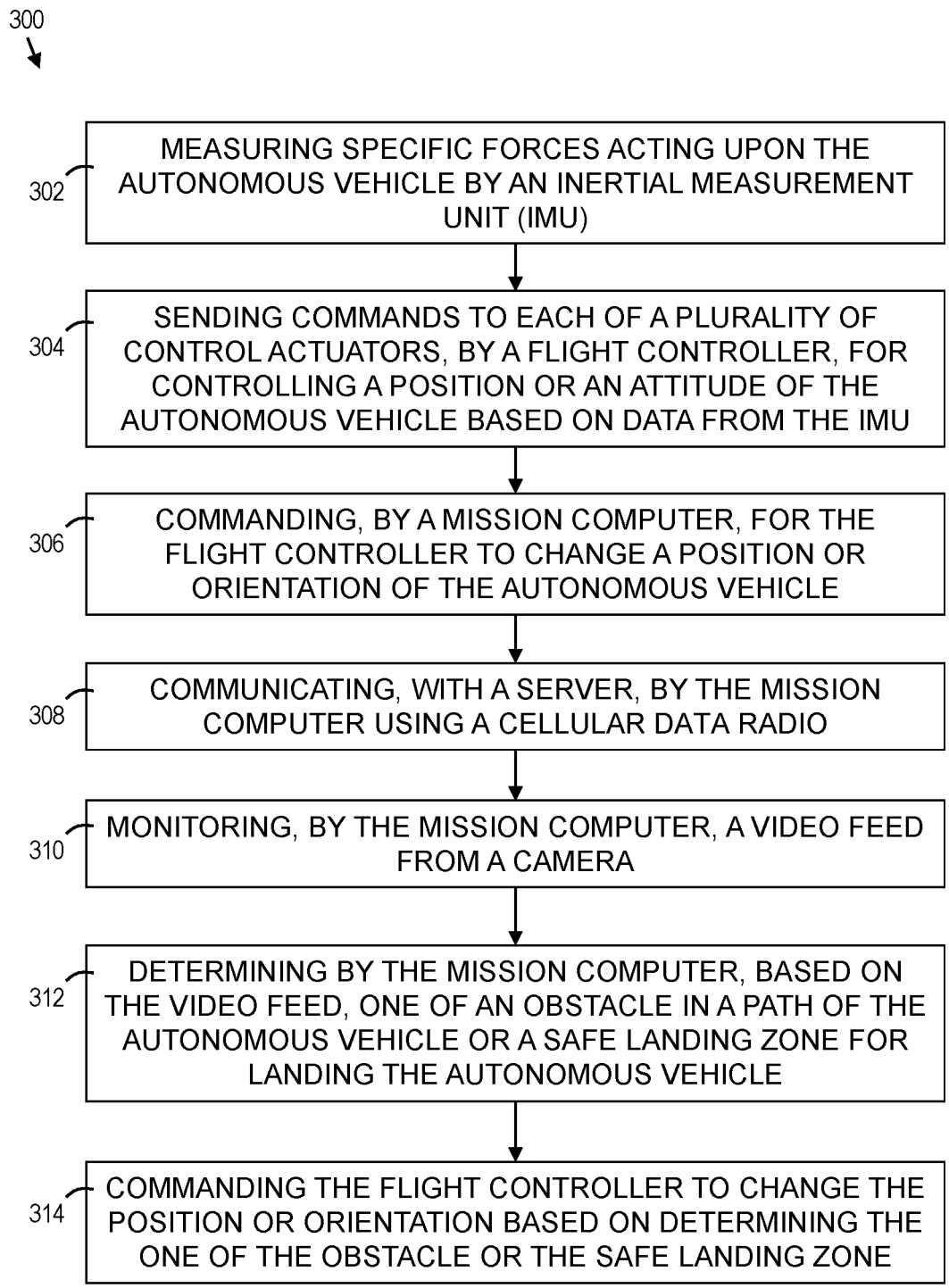
FIG. 6 is a flow diagram generally illustrating a method of operating an autonomous vehicle, according to principles of the present disclosure.

FIG. 6 is a flow diagram generally illustrating a method 300 of operating an autonomous vehicle 10, according to the principles of the present disclosure. At 302, the method 300 measures specific forces acting upon the autonomous vehicle 10 by an inertial measurement unit (IMU) 36. For example, the IMU 36 may include one or more sensors, such as accelerometers and/or gyroscopes, to determine accelerations in each of three orthogonal dimensions and/or rotations about each of three orthogonal axes.

At 304, the method 300 sends commands to each of a plurality of control actuators 93, 98, by a flight controller 32, for controlling a position or an attitude of the autonomous vehicle 10 based on data from the IMU 36 regarding the specific forces acting upon the autonomous vehicle 10. The flight controller 32 may perform step 304 repeatedly, using a high-speed flight control loop. In some embodiments, the flight control loop may operate at a speed of at least about 100 Hz. In some embodiments, the flight control loop may operate at a speed of at least about 1 kHz. In some embodiments, the flight control loop may operate on a periodic basis, based on a clock signal.

At 306, the method 300 commands, by a mission computer 42, for the flight controller 32 to change a position or orientation of the autonomous vehicle 10. For example, the mission computer 42 may command the flight controller 32 with a particular command, such as to turn to the right, in order to cause the autonomous vehicle 10 to change in heading or direction. Step 306 may include, for example, the mission computer 42 determining the commanded position based on one or more different criteria. In some embodiments, for example, the mission computer 42 may function as an autopilot, directing the flight controller 32 to cause the autonomous vehicle 10 to move to a next waypoint after having moved past a given location.

At 308, the method 300 communicates, with a server 170, by the mission computer 42 using a cellular data radio. For example, the mission computer 42 may communicate with the server 170 wirelessly, over via a communications network 160. The cellular data radio may include, for example, an LTE module 62. The mission computer 42 may communicate with the server 170 while the autonomous vehicle 10 is in motion. For example, the mission computer may communicate with the server 170 using the LTE module 62 while the autonomous vehicle 10 is performing a mission. Alternatively or additionally, the mission computer 42 may communicate with the server 170 while the autonomous vehicle 10 is stationary. For example, the mission computer may communicate with the server 170 using the LTE module 62 while the autonomous vehicle 10 is parked at a home base location.

In some embodiments, step 308 may include transmitting, by the server 170, a system software package. For example, an updated firmware for a particular type of hardware may be made available, by the server 170. Step 308 may also receive the system software package by the mission computer 42. Step 308 may also install, based on the system software package, a firmware update to at least one of the mission computer 42 or the flight controller 32. For example, the mission computer 42 may extract one or more firmware updates from the system software package, and cause the one or more firmware updates to be installed and to run on the mission computer 42 and/or the flight controller 32. The mission computer 42 may wait and only install the firmware update when the autonomous vehicle 10 is in a predetermined safe state, such as being landed and/or plugged-in to a battery charger.

The method 300 may further include the IMU 36, the flight controller 32, the mission computer 42, and the LTE module 62 all being disposed within a housing located onboard the autonomous vehicle.

At 310, the method 300 may monitor, by the mission computer 42 a video feed from a camera. For example, the mission computer 42 may read and process a stream of video data from one or more cameras 80 located on the autonomous vehicle. The one or more cameras 80 may include stereoscopic cameras, which may detect visible light and/or light that is outside of the visible spectrum. Additionally or alternatively, the mission computer 42 may receive and process the video feed from one or more cameras that are located outside of the autonomous vehicle 10, such as a camera located onboard another vehicle and/or a camera in a fixed location.

At 312, the method 300 may determine, by the mission computer 42, based on the video feed, one of: an obstacle in a path of the autonomous vehicle 10, or a safe landing zone for landing the autonomous vehicle 10. For example, the mission computer 42 may perform one or more image recognition techniques to determine, and classify an obstacle and to determine a location and/or a path of the obstacle to determine if there is a risk of the autonomous vehicle colliding with the obstacle. In another example, the mission computer 42 may perform one or more image recognition techniques to determine, and classify an area of ground near the autonomous vehicle 10 to determine of that area of ground is a safe landing zone, where the autonomous vehicle 10 could safely land. The image recognition techniques may include, for example, pattern matching, or machine learning (ML).

At 314, the method 300 may include commanding for the flight controller 32 to change the position or orientation of the autonomous vehicle 10 at step 306 to further include commanding the flight controller 32 to change the position or orientation based on determining the one of the obstacle or the safe landing zone. For example, the mission computer 42 may command for the flight controller 32 to take an evasive maneuver in order to avoid colliding with an obstacle. In another example, the mission computer 42 may direct the flight controller 32 to land the autonomous vehicle 10 at a location that is determined to be a safe landing zone, provided that other conditions for landing are satisfied.

In some embodiments, a vehicle controller for operating an autonomous vehicle comprises: an inertial measurement unit (IMU) configured measure specific forces acting upon the autonomous vehicle, and a flight controller configured to execute a high-speed control loop to periodically update commands to a plurality of control actuators for controlling a position or an attitude of the autonomous vehicle based on data from the IMU regarding the specific forces acting upon the autonomous vehicle. The vehicle controller may also comprise a mission computer including a processor programmed to control a mission of the autonomous vehicle. For example, the processor may control navigating the autonomous vehicle between a plurality of waypoint locations using location data from one or more sources, such as from a GPS receiver. The mission of the autonomous vehicle may also include controlling one or more payload devices. The vehicle controller may also comprise a cellular data radio configured to wirelessly communicate via a cellular network. The cellular data radio may include, for example, the LTE module 62. The vehicle controller may also comprise a housing containing the IMU, the flight controller, the mission computer, and the cellular data radio.

In some embodiments, the mission computer may be configured to monitor a video feed from a camera process to use the video feed to detect an object and to cause the autonomous vehicle to avoid colliding with the object.

In some embodiments, the mission computer may be configured to monitor a video feed from a camera and to process the video feed to detect a safe landing zone for landing the autonomous vehicle.

In some embodiments, the mission computer may be configured to monitor a video feed from a camera and encode the video feed into a compressed format for transmission to a remote receiver.

In some embodiments, the vehicle controller may further comprise a Wi-Fi radio located within the housing. The Wi-Fi radio may be configured to communicate with a ground station for controlling the autonomous vehicle. For example, the Wi-Fi radio may receive commands, such as one or more attitude or positioning commands, or waypoint location commands from the ground station. In some embodiments, the Wi-Fi radio may transmit information to the ground station. For example, the Wi-Fi radio may transmit telemetry data and/or live video data from one or more cameras located aboard the autonomous vehicle.

In some embodiments, the vehicle controller may further comprise a Wi-Fi radio located within the housing and configured to communicate with a second autonomous vehicle. For example, the autonomous vehicle and the second autonomous vehicle may share data or commands using the Wi-Fi radio. In some embodiments, multiple autonomous vehicles each having a Wi-Fi radio may form a mesh network.

In some embodiments, the vehicle controller may further comprise an Ethernet switch located within the housing and connected to the mission computer.

In some embodiments, the vehicle controller may further comprise a wired data connection to a second vehicle controller; and wherein the flight controller is configured to receive control commands from the second vehicle controller in response to determining the mission computer being in a faulted condition. For example, the autonomous vehicle may include two independent vehicle controllers configured for redundant operation. In some embodiments, the wired data connection to the second vehicle controller may include an Ethernet connection. However, other types of wired data connection may be used.

In some embodiments, the IMU may comprise a substrate with a heat spreader base of thermally conductive material configured to provide a temperature differential across the substrate within a predetermined range.

In some embodiments, the vehicle controller may further comprise a bracket holding the IMU to at least one of the flight controller or the housing. In some embodiments, the bracket may be configured to isolate the IMU from heat generated by at least one of the flight controller or the mission computer. In some embodiments, the bracket may include a damper configured to isolate the IMU from vibration. In some embodiments, the bracket may include a rigid mounting configured to transmit vibration between the housing and the IMU. For example, the bracket may not include any isolating damper to isolate the IMU from vibration.

In some embodiments, the flight controller may be configured to sample and filter the data from the IMU at a rate substantially faster than the high-speed control loop. For example, sampling and filtering the data from the IMU may be performed between 4× and 100× faster than the high-speed control loop.

In some embodiments, a vehicle controller for operating an autonomous vehicle comprises: an inertial measurement unit (IMU) configured measure specific forces acting upon the autonomous vehicle, and a flight controller configured to execute a high-speed control loop to periodically update commands to a plurality of control actuators for controlling a position or an attitude of the autonomous vehicle based on data from the IMU regarding the specific forces acting upon the autonomous vehicle. In some embodiments, the vehicle controller also comprises a mission computer including a processor programmed to control a mission of the autonomous vehicle, and a housing containing the IMU, the flight controller, and the mission computer. In some embodiments, the mission computer includes an application programming interface to provide vehicle status information and payload data to a third-party application. For example, the vehicle status information may include location and/or telemetry data. The payload data may include sensor data, such as images or video, from one or more payload sensors.

In some embodiments, the application programming interface may be further configured to receive commands from the third-party application. For example, the commands may include one or more attitude or positioning commands, or one or more commands for a destination location for the autonomous vehicle.

In some embodiments, a method of operating an autonomous vehicle is provided. The method includes: measuring specific forces acting upon the autonomous vehicle by an inertial measurement unit (IMU); sending commands to each of a plurality of control actuators, by a flight controller, for controlling a position or an attitude of the autonomous vehicle based on data from the IMU regarding the specific forces acting upon the autonomous vehicle; commanding, by a mission computer, for the flight controller to change a position or orientation of the autonomous vehicle; and communicating, with a server, by the mission computer using a cellular data radio. In some embodiments, the IMU, the flight controller, the mission computer, and the cellular data radio are all disposed within a housing located onboard the autonomous vehicle.

In some embodiments, communicating with the server further includes: transmitting, by the server, a system software package; receiving the system software package by the mission computer; and installing, based on the system software package, a firmware update to at least one of the mission computer or the flight controller. For example, the mission computer may be programmed to coordinate receiving the system software package, extracting the firmware upgrade from the system software package, and/or installing the firmware upgrade on the mission computer and/or the flight controller.

In some embodiments, the method of operating the autonomous vehicle further includes: monitoring, by the mission computer a video feed from a camera; and determining, by the mission computer, based on the video feed, one of an obstacle in a path of the autonomous vehicle or a safe landing zone for landing the autonomous vehicle. In some embodiments, commanding for the flight controller to change the position or orientation of the autonomous vehicle includes commanding the flight controller to change the position or orientation based on determining the one of the obstacle or the safe landing zone.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle controller for operating an autonomous vehicle, comprising:
    an inertial measurement unit (IMU) configured measure specific forces acting upon the autonomous vehicle;
    a flight controller configured to execute a high-speed control loop to periodically update commands to a plurality of control actuators for controlling a position or an attitude of the autonomous vehicle based on data from the IMU regarding the specific forces acting upon the autonomous vehicle;
    a mission computer including a processor that is separate and independent from the flight controller and programmed to control a mission of the autonomous vehicle;
    a cellular data radio configured to wirelessly communicate via a cellular network;
    a housing containing the IMU, the flight controller, the mission computer, and the cellular data radio, wherein the housing is independent of a structure of the autonomous vehicle and configured for removable attachment thereto, together with the IMU, the flight controller, the mission computer, and the cellular data radio; and
    at least one of: a plurality of mounting tabs each extending from the housing and arranged to receive a fastener for securing the vehicle controller to the structure of the autonomous vehicle, or a plurality of electrical connectors each configured for selective and removable attachment to an external device outside of the housing.

2. The vehicle controller of claim 1, further comprising a Wi-Fi radio located within the housing and configured to receive a command from a ground station for controlling the autonomous vehicle, and wherein the command from the ground station includes at least one of an attitude or positioning command or a waypoint location command.

3. The vehicle controller of claim 1, further comprising a Wi-Fi radio located within the housing and configured to communicate with a second autonomous vehicle.

4. The vehicle controller of claim 1, further comprising a wired data connection to a second vehicle controller; and wherein the flight controller is configured to receive control commands from the second vehicle controller in response to determining the mission computer being in a faulted condition.

5. The vehicle controller of claim 4, wherein the wired data connection to the second vehicle controller includes an Ethernet connection.

6. The vehicle controller of claim 1, wherein the IMU comprises a substrate with a heat spreader base of thermally conductive material configured to provide a temperature differential across the substrate within a predetermined range.

7. The vehicle controller of claim 1, further comprising a bracket holding the IMU to at least one of the flight controller or the housing.

8. The vehicle controller of claim 7, wherein the bracket is configured to isolate the IMU from heat generated by at least one of the flight controller or the mission computer.

9. The vehicle controller of claim 7, wherein the bracket includes a damper configured to isolate the IMU from vibration.

10. The vehicle controller of claim 7, wherein the bracket includes rigid mounting configured to transmit vibration between the housing and the IMU.

11. The vehicle controller of claim 1, wherein the flight controller is configured to sample and filter the data from the IMU at a rate substantially faster than the high-speed control loop.

12. The vehicle controller of claim 1, wherein the vehicle controller includes the plurality of mounting tabs each extending from the housing and arranged to receive a fastener for securing the vehicle controller to the structure of the autonomous vehicle.

13. The vehicle controller of claim 12, wherein each mounting tab of the plurality of mounting tabs extends from a corresponding corner of the housing.

14. The vehicle controller of claim 1, wherein the vehicle controller includes the plurality of electrical connectors each configured for selective and removable attachment to an external device outside of the housing, and wherein the external device includes at least one of: an electric speed controller (ESC) electrically connected to an electric motor, a servo motor, a camera, and an antenna.

15. The vehicle controller of claim 14, wherein the external device includes at least one of: an electric speed controller (ESC) electrically connected to an electric motor, or a servo motor.

16. A vehicle controller for operating an autonomous vehicle, comprising:
an inertial measurement unit (IMU) configured measure specific forces acting upon the autonomous vehicle;
a flight controller configured to execute a high-speed control loop to periodically update commands to a plurality of control actuators for controlling a position or an attitude of the autonomous vehicle based on data from the IMU regarding the specific forces acting upon the autonomous vehicle;
a mission computer including a processor programmed to control a mission of the autonomous vehicle, the mission computer including an application programming interface to provide vehicle status information and payload data to a third-party application; and
a housing containing the IMU, the flight controller, and the mission computer, wherein the housing is independent of a structure of the autonomous vehicle and configured for removable attachment thereto, together with the IMU, the flight controller, the mission computer, and the cellular data radio; and
at least one of: a plurality of mounting tabs each extending from the housing and arranged to receive a fastener for securing the vehicle controller to the structure of the autonomous vehicle, or a plurality of electrical connectors each configured for selective and removable attachment to an external device outside of the housing.

17. The vehicle controller of claim 16, wherein the application programming interface is further configured to receive commands from the third-party application.

18. A method of operating an autonomous vehicle, comprising:
measuring specific forces acting upon the autonomous vehicle by an inertial measurement unit (IMU);
sending commands to each of a plurality of control actuators, by a flight controller, for controlling a position or an attitude of the autonomous vehicle based on data from the IMU regarding the specific forces acting upon the autonomous vehicle;
generating, by a mission computer that is separate and independent from the flight controller, a command for the flight controller to change a position or orientation of the autonomous vehicle;
communicating, with a server, by the mission computer using a cellular data radio; and
wherein the IMU, the flight controller, the mission computer, and the cellular data radio are all configured as an integrated unit disposed within a housing located onboard the autonomous vehicle, wherein the housing is independent of a structure of the autonomous vehicle and configured for removable attachment thereto, together with the IMU, the flight controller, the mission computer, and the cellular data radio; and
wherein the integrated unit includes at least one of: a plurality of mounting tabs each extending from the housing and arranged to receive a fastener for securing the vehicle controller to the structure of the autonomous vehicle, or a plurality of electrical connectors each configured for selective and removable attachment to an external device outside of the housing.

19. The method of claim 18, wherein communicating with the server further comprises:
transmitting, by the server, a system software package;
receiving the system software package by the mission computer; and
installing, based on the system software package, a firmware update to at least one of the mission computer or the flight controller.

20. The method of claim 18, further comprising:
monitoring, by the mission computer a video feed from a camera;
determining, by the mission computer, based on the video feed, one of an obstacle in a path of the autonomous vehicle or a safe landing zone for landing the autonomous vehicle; and
wherein commanding for the flight controller to change the position or orientation of the autonomous vehicle includes commanding the flight controller to change the position or orientation based on determining the one of the obstacle or the safe landing zone.

* * * * *